(12) United States Patent
Galloway

(10) Patent No.: US 11,584,337 B2
(45) Date of Patent: Feb. 21, 2023

(54) DRIVEN AND NON-DRIVEN REAR WHEEL REGENERATIVE POWER SPRING BRAKING APPARATUS, METHOD, AND KIT

(71) Applicant: Clark Steven Galloway, Albuquerque, NM (US)

(72) Inventor: Clark Steven Galloway, Albuquerque, NM (US)

( * ) Notice: Subject to any disclaimer, the term of this patent is extended or adjusted under 35 U.S.C. 154(b) by 429 days.

(21) Appl. No.: 16/792,390

(22) Filed: Feb. 17, 2020

(65) Prior Publication Data

US 2021/0070259 A1 Mar. 11, 2021

Related U.S. Application Data

(60) Provisional application No. 62/898,483, filed on Sep. 10, 2019.

(51) Int. Cl.
*B60T 1/10* (2006.01)
*B60L 15/20* (2006.01)
*B60L 7/18* (2006.01)

(52) U.S. Cl.
CPC ............ *B60T 1/10* (2013.01); *B60L 15/2009* (2013.01); *B60L 7/18* (2013.01); *B60L 2240/12* (2013.01); *B60L 2240/423* (2013.01); *B60T 2270/602* (2013.01); *B60T 2270/604* (2013.01)

(58) Field of Classification Search
None
See application file for complete search history.

(56) References Cited

U.S. PATENT DOCUMENTS

| 1,508,558 | A | | 9/1924 | Kollmann |
| 4,159,042 | A | | 6/1979 | Jayner |
| 4,310,079 | A | | 1/1982 | Hoppie |
| 4,813,509 | A | * | 3/1989 | Harris ............... B60K 6/10 180/165 |
| 6,557,877 | B2 | | 5/2003 | Dunkley |
| 7,473,204 | B2 | | 1/2009 | Costello |
| 10,279,785 | B1 | | 5/2019 | Shapiro |
| 2003/0111280 | A1 | * | 6/2003 | Platner ............. B60L 50/52 180/65.6 |
| 2008/0128225 | A1 | * | 6/2008 | Iraschko ........... F16D 65/52 188/18 R |
| 2021/0016667 | A1 | * | 1/2021 | Moubarak ......... B60W 30/045 |

FOREIGN PATENT DOCUMENTS

KR 10-2013-005737 A 5/2013

* cited by examiner

*Primary Examiner* — Todd Melton
*Assistant Examiner* — Jason R Roberson
(74) *Attorney, Agent, or Firm* — Wilcox & Myers, P.C.; Jeffrey D. Myers

(57) ABSTRACT

A regenerative braking apparatus for a motor vehicle (and concomitant method and retrofit kit) comprising a two-piece rim, a power spring inside the rim, a winding apparatus transferring energy into the power spring, a speed reducer that allows for smooth accumulation of tension in the power spring, and a controlled holding brake system that allows for bypassed, autonomous, or on-demand application of the regenerative braking apparatus.

18 Claims, 5 Drawing Sheets

DRIVEN AND NON-DRIVEN REAR WHEEL REGENERATIVE POWER SPRING BRAKING APPARATUS, METHOD, AND KIT

CROSS-REFERENCE TO RELATED APPLICATIONS

This application claims priority to and the benefit of the filing of U.S. Provisional Patent Application Ser. No. 62/898,483, filed on Sep. 10, 2019, and the specifications and claims thereof are incorporated herein by reference.

STATEMENT REGARDING FEDERALLY SPONSORED RESEARCH OR DEVELOPMENT

Not Applicable.

NAMES OF PARTIES TO JOINT RESEARCH AGREEMENT

Not Applicable.

REFERENCE TO A SEQUENCE LISTING, A TABLE, OR A COMPUTER PROGRAM LISTING COMPACT DISC APPENDIX

Not Applicable.

STATEMENT REGARDING PRIOR DISCLOSURES BY THE INVENTOR OR A JOINT INVENTOR

Not Applicable.

BACKGROUND OF THE INVENTION

Field of the Invention (Technical Field)

The present invention relates to regenerative brake apparatuses, methods, and retrofit kits.

DESCRIPTION OF RELATED ART

Carbon emissions are at an all-time high with dwindling methods to dispose of the resulting carbon-containing molecules. One large producer are automotive devices, both as to those with combustion engines and electric vehicles. Combustion engines put carbon emissions directly into the air. Producing and storing electricity also creates a large carbon footprint. As vehicle manufacturers struggle to meet Environmental Protection Agency (EPA) regulations, as well as similar regulatory bodies worldwide, several advancements have been made to make vehicles more efficient. The continued effort in this field is important so that humans can stabilize and reduce carbon emissions.

U.S. Pat. No. 10,279,785 to Shapiro shows a regenerative brake system based on fluid pressurization to store energy. U.S. Pat. No. 6,557,877 to Dunkley shows an apparatus for bicycles or other smaller vehicles. Additionally, U.S. Pat. No. 7,473,204 to Costello shows a spring apparatus that mounts to the drive shaft.

BRIEF SUMMARY OF THE INVENTION

The present invention is of a regenerative braking apparatus for a motor vehicle (and concomitant method and retrofit kit), comprising: a two-piece rim; a power spring inside the rim; a winding apparatus transferring energy into the power spring; a speed reducer that allows for smooth accumulation of tension in the power spring; and a controlled holding brake system that allows for bypassed, autonomous, or on-demand application of the regenerative braking apparatus. In certain embodiments, there is no interference by said regenerative braking apparatus during normal operation of the motor vehicle. The winding apparatus comprises a cone brake and a wheel drum. A power transfer coupler assembly controls the winding apparatus. The power spring is preferably a spiral spring, most preferably a heavy duty spiral spring. The power spring builds tension at a rate that is determined by the speed reducer configuration of about 2:1 revolutions or greater.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
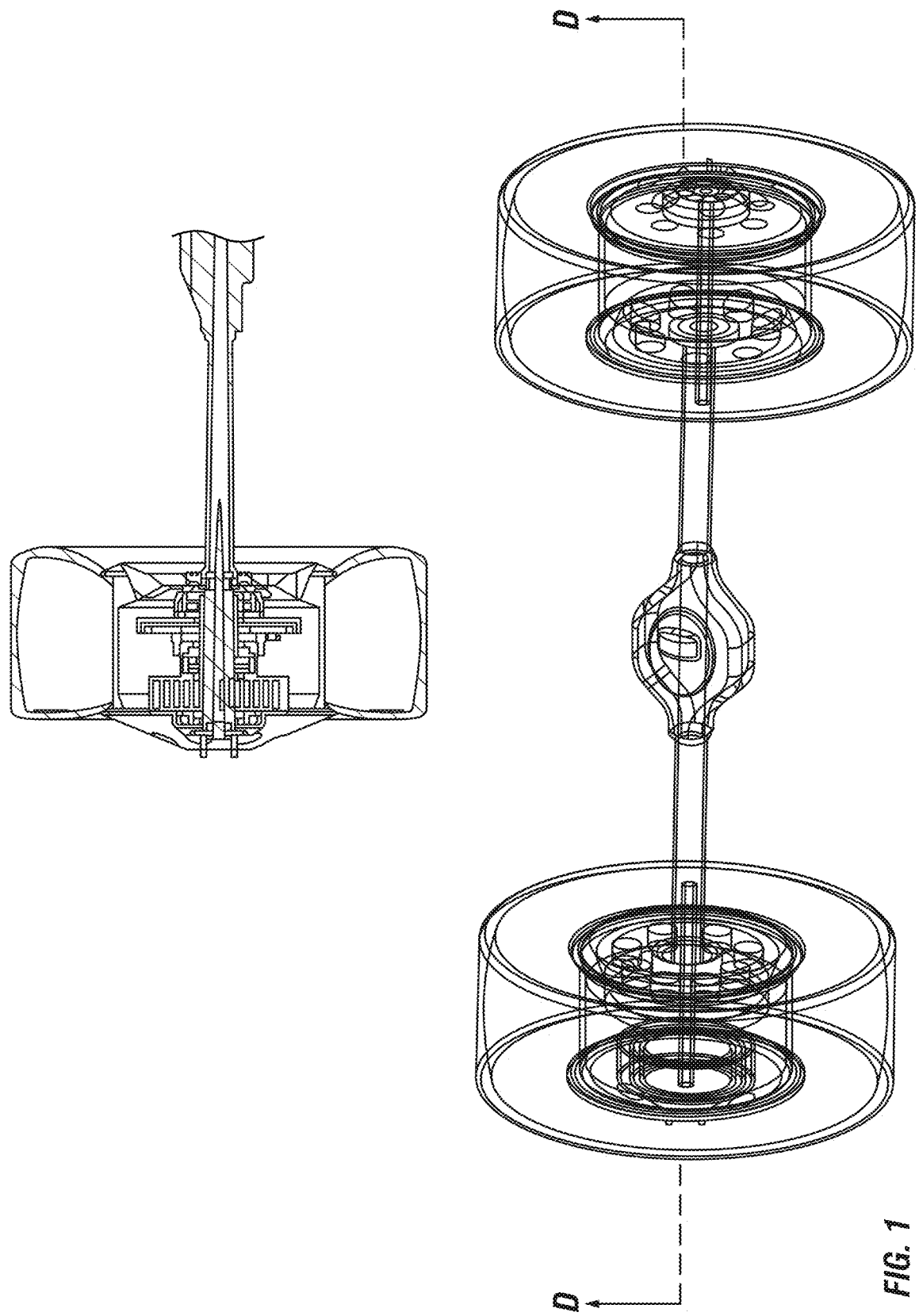
FIG. 1 is an overview and cross section of the driven wheel configuration of the invention and the location of the regenerative brake as it relates to the dimensions of the rim.

The present invention is of a driven or non-driven wheel mechanical regenerative braking system, method, and kit that allows for accumulated potential energy to be stored in a power spring and released by the operator of a vehicle at their discretion. An operator can choose to disable the accumulation of stored energy in inclement weather conditions if needed. The power spring can be increased in size and tension to provide desired performance to any vehicle. Front wheel drive vehicles have two underutilized rear tires for this application to be implemented, allowing for previously unrecognized efficiency. Front wheel drive vehicles will be the most popular driveline configurations for passenger vehicles in the future and with this embodiment their efficiency will increase significantly. Rear wheel drive vehicles can also benefit from the high thrust/torque achievable with this invention that when incorporated can significantly reduce the excessive fuel consumption required to overcome rolling resistance associated with varying payloads.

The purpose of this improved regenerative brake invention is to store a greater amount of otherwise lost energy when braking a vehicle. This apparatus can be used in the automotive industry (combustion or electric) on the rear wheels (driven and non-driven) and would act in conjunction with a traditional friction drum brake. The rim of the car where the mechanical regenerative brake (power spring) resides would be of a different configuration than rims available today. The rim comprising two parts assembles around the apparatus of the invention, which is mounted to a fixed shaft or splined hollow (axle housing/extension) allowing passage of drive axle through the apparatus and fastening to the outer rim in the driven wheel configuration. The benefits of a two-part rim configuration are increased space to accommodate a powerful spring and an apparatus to harness the otherwise lost braking energy. This apparatus increases MPG in stop and go traffic for the average vehicle. This higher energy regenerative brake also has application in the delivery industry where frequent stops and high rolling resistance are the norm. Torque from this configuration will be able to exceed that of most engines and ultimately allow normal passenger vehicle engine size to be reduced. The design allows for the thrust generated in the device to be applied automatically at the driver's discretion with a metered release of spring tension via the spring's holding brake attached to the spring housing.

The forward motion of the vehicle is slowed when the apparatus is engaged at which time the kinetic energy transfers into the spring and is stored as potential energy. This is performed using a series of brakes, planetary gears, and actuators. In addition, a primary friction drum brake is incorporated for the more rigorous repetitive and final braking action. The mechanical regenerative brake system acts as an accessory to the main brake to which it is attached.

Figure 2:
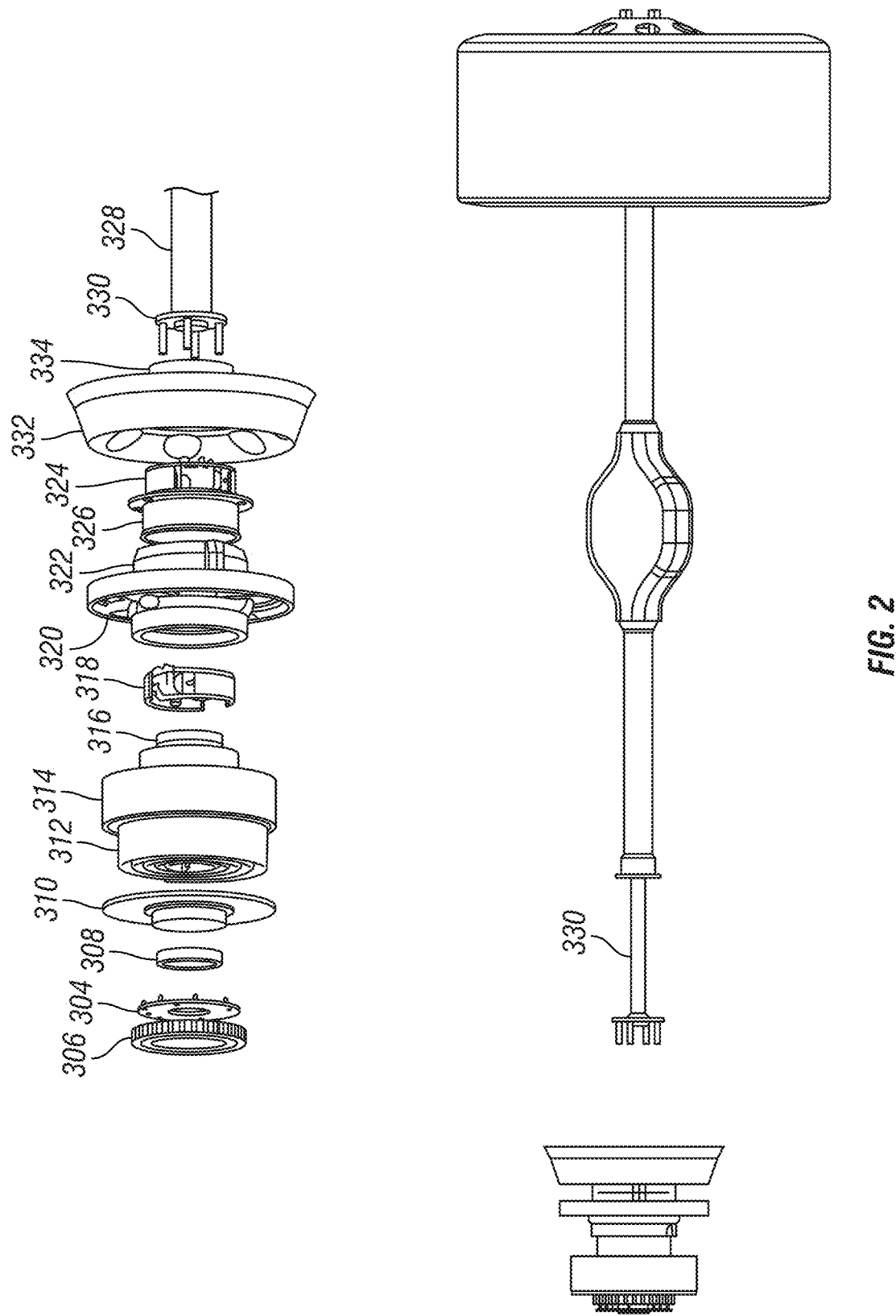
FIG. 2 is a perspective view of the regenerative brake of the driven wheel configuration of the invention.
Figure 3:
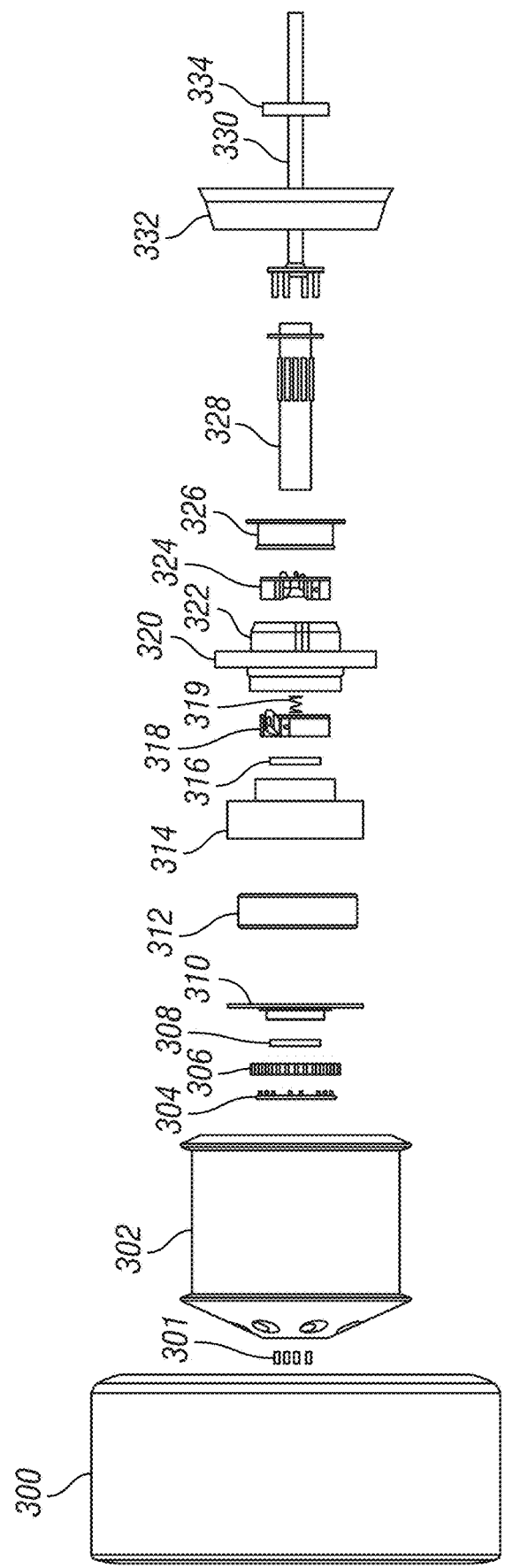
FIG. 3 is an exploded view of the driven wheel configuration with reference numerals.

FIG. 1 is an overview of the driven wheel configuration of the invention and how the embodiment relates to the predetermined profile of the wheel. FIG. 2 shows the relationship of the embodiment to the rear axle and rear axle housing. FIG. 3 provides an exploded view and reference numerals of the preferred driven wheel regenerative braking components and axle housing extension 328 and two-part rim (inside 332 and outside 302) which allow for space to house the powerful spring and winding apparatus.

Figure 4:
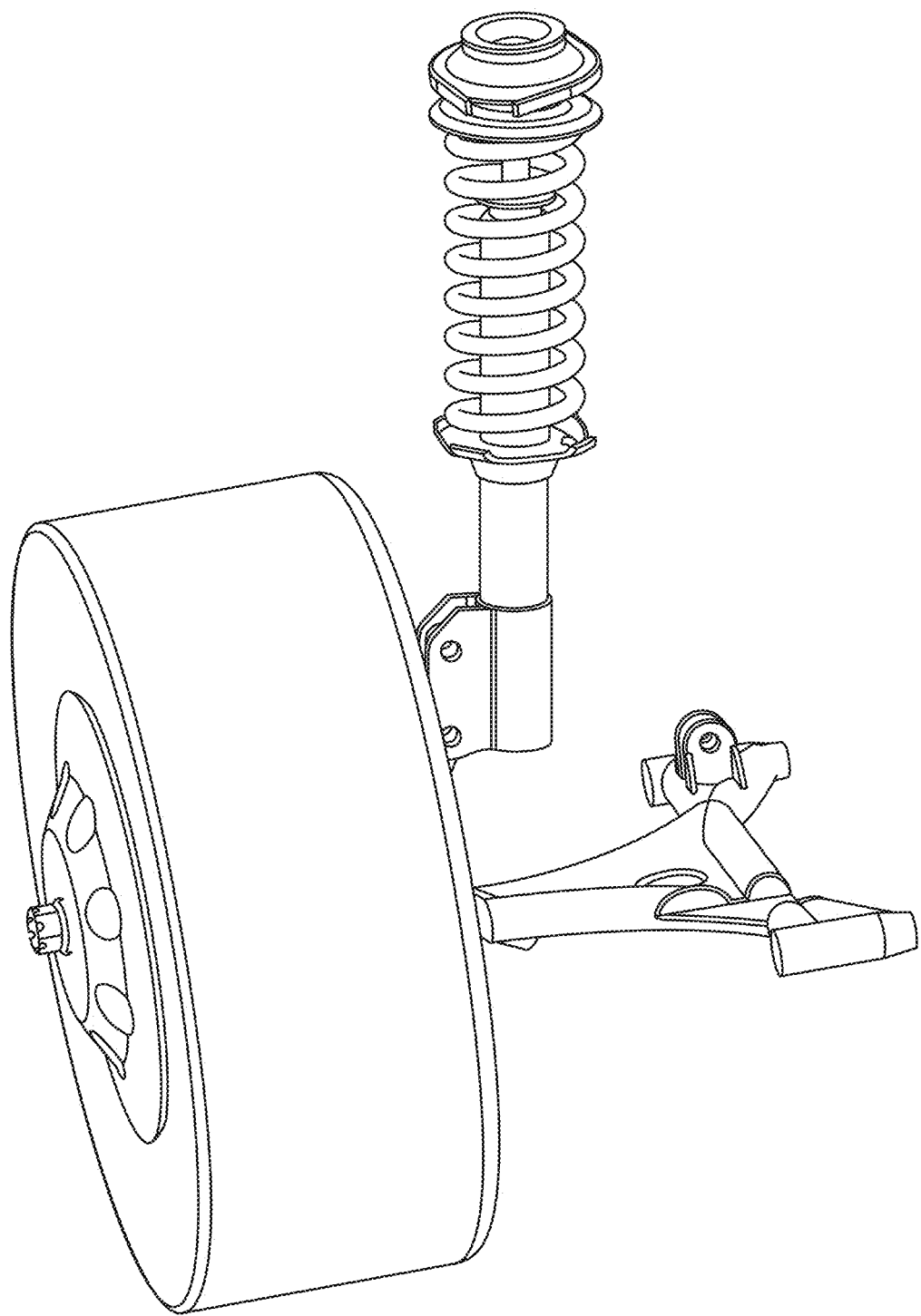
FIG. 4 is a perspective view of the non-driven regenerative brake configuration of the invention.
Figure 5:
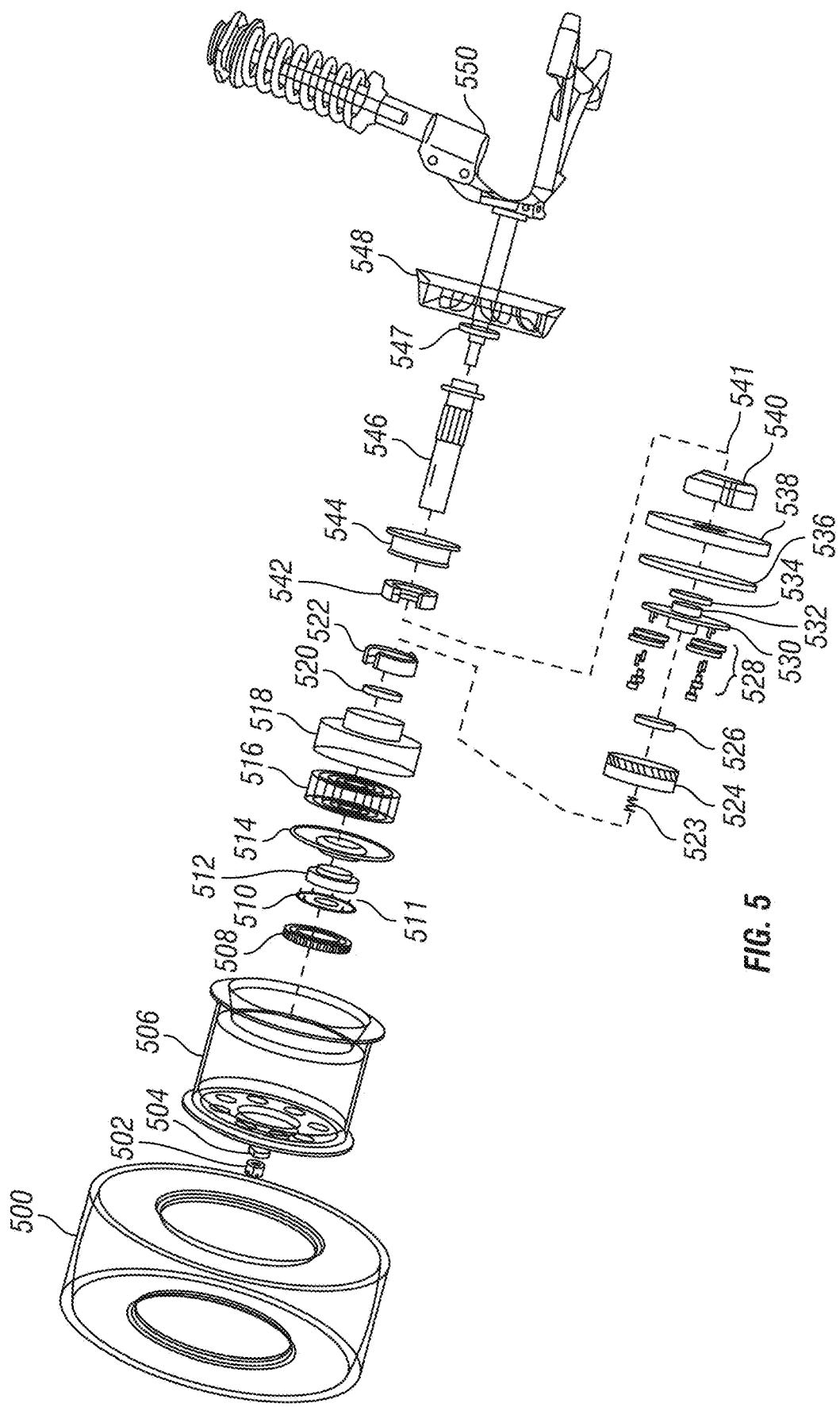
FIG. 5 is an exploded view of non-driven wheel configuration with reference numerals.

FIG. 4 is an overview of the non-driven wheel configuration of the invention and how the embodiment relates to the predetermined profile of the wheel. FIG. 5 provides an exploded view of the non-driven wheel configuration with reference numerals for the components.

Returning to the driven wheel embodiment, FIG. 3 is the primary reference for the description of this configuration. As one follows the path of motion one begins at the right of the figure or descending from 334. Upon regenerative brake application, the forward motion of the vehicle is acted upon by the Cone Brake 322 and Wheel Drum 326 attached to Inner Rim transfers energy into the Spring Drum 314 and Power Spring 312 when the Power Transfer Coupler Assembly (Slide Collar and attached speed reducing, rotation changing Planetary Gear Assembly and Power Transfer Collar 320) are pressed outward along the stationary Axle Housing Extension 328 by Loading Brake Actuator (not shown) to engage splines of Spring Drum 314. Spring tension and subsequent metered release is controlled by the actuation of Holding Brake 318 on Spring Drum 314. Once generated spring tension has reached desired level and the Holding Brake 318 is engaged the Loading Brake Actuator (not shown) is de-energized decoupling Power Transfer Coupler Assembly 320 and Cone Brake 322 from input power Wheel Drum 326 and attached Inside Rim 332. Remaining vehicle braking action is then handled by the Primary Drum Brake 324 and Wheel Drum 326 attached to Inner Rim 332.

Once the vehicle is stopped and the vehicle's transmission is not in park position, the regenerative brake system, when activated, will be allowed to release the stored spring energy. The Power Spring 312 affixed to Spring Drum/Spring Drum Cover 314,310 and attached Torque Clutch 306 is engaged with the Outer Rim 302 when Release Actuator (not shown) disengages Pin Ring 304 from Torque Clutch 306. The Power Spring's 312 energy release will be metered by Holding Brake's 318 controlled actuation. When spring tension is exhausted the Release Actuator (not shown) de-energizes and allows Pin Ring 304 to return to rest position and release the Torque Clutch's 306 engagement with Outer Rim 302 and resume the zero-interference relation to the driven wheel.

Driven Wheel (FIG. 3) Reference Numerals

| | |
|---|---|
| 300 | Tire |
| 301 | Lug Nuts |
| 302 | Outer Rim |
| 304 | Pin Ring |
| 322 | Cone Brake |
| 306 | Torque Clutch Assembly |
| 308 | Bearing |
| 310 | Spring Drum Cover |
| 312 | Power Spring |
| 314 | Spring Drum |
| 316 | Bearing |
| 318 | Holding Brake |
| 319 | Return Spring |
| 320 | Power Transfer Coupler Assembly |
| 324 | Primary Drum Brake |
| 332 | Inner Rim |
| 334 | Tapered Roller Bearing |
| 326 | Wheel Drum |
| 328 | Axle Housing Extension |
| 330 | Drive Axle |

FIG. 5 is the reference for the description of the non-driven wheel configuration of the invention. As one follows the path of motion one begins at the right of the figure or descending from reference numeral 550. Upon regenerative brake application, the forward motion of the vehicle is acted upon by the Cone Brake 540 and Wheel Drum 544 attached to Inner Rim 548 transfers energy into the Spring Drum 518 and Power Spring 516 when the Power Transfer Coupler Assembly (Slide Collar and attached speed reducing, rotation changing Planetary Gear Assembly and Power Transfer Collar 524,540) are pressed outward sliding along the stationary Spindle Adapter 546 by Loading Brake Actuator (not shown) to engage splines of Spring Drum 518. Spring tension and subsequent metered release is controlled by the actuation of Holding Brake 522 on Spring Drum 518. Once generated spring tension is sufficient and the Holding Brake 522 is engaged the Loading Brake Actuator (not shown) is de-energized decoupling Power Transfer Coupler Assembly 524,540 and Cone Brake 540 from input power Wheel Drum 544 and attached Inside Rim 548. Remaining vehicle braking action is then handled by the Primary Drum Brake 542 and Wheel Drum 544 attached to Inner Rim 548.

Once the vehicle is stopped and the vehicle's transmission is not in park position, the regenerative brake system, when activated, will be allowed to release the stored spring energy.

The Power Spring 516 affixed to Spring Drum/Spring Drum Cover 518,514 and attached Torque Clutch 508 is engaged with the Outer Rim 506 when Release Actuator (not shown) disengages Pin Ring 510 from Torque Clutch 508. The Power Spring's 516 energy release is metered by Holding Brake's 522 controlled actuation. When spring tension is exhausted the Release Actuator (not shown) de-energizes and allows Pin Ring 510 to return to rest position and release the Torque Clutch's 508 engagement with Outer Rim 506 and resume the zero-interference relation to the non-driven wheel.

In this embodiment, the Power Transfer Coupling Assembly comprises Return Spring 523, Power Transfer Collar 524, Bearing 526, Combination Gears 528, Planetary Gear Plate 530, Slide Collar 532, Bearing 534, Planetary Ring Gear 536, Ring Gear Disc 538, and Cone Brake 540.

Non-Driven Wheel (FIG. 5) Reference Numerals

| | |
|---|---|
| 500 | Tire |
| 524 | Power Transfer Collar |
| 502 | Castle Nut |
| 504 | Tapered Roller Bearing |
| 506 | Outer Rim |
| 508 | Torque Clutch Ring |
| 510 | Pin Ring |
| 512 | Torque Clutch & Bearing |
| 514 | Spring Drum Cover |
| 516 | Power Spring |
| 518 | Spring Drum |
| 520 | Bearing |
| 522 | Holding Brake |
| 523 | Return Spring |
| 550 | Rear Suspension and Fixed Spindle |
| 538 | Ring Gear Disc |
| 526 | Bearing |
| 528 | Combination Gears |
| 530 | Planetary Gear Plate |
| 532 | Slide Collar |
| 534 | Bearing |
| 540 | Cone Brake |
| 536 | Planetary Ring Gear |
| 542 | Primary Drum Brake |
| 544 | Wheel Drum |
| 546 | Spindle Adapter |
| 547 | Tapered Bearing |
| 548 | Inner Rim |

When braking in either embodiment, a power spring will build tension (typically measured in N-m or ft-lbf) at a rate that is determined by the speed reducer configuration of about 2:1 revolutions or greater, preferably about 3:1 to 4:1, allowing for smooth accumulation of power spring tension. The size and resistance of the power spring should be proportional to the vehicle weight for desired performance. When activated the actuators and holding brake of the regenerative braking apparatus will operate autonomously referencing inputs from sensors that monitor the operator's normal driving habits (throttle position-acceleration, speedometer and brake pedal pressure when braking). The power spring is preferably a spiral spring, most preferably a heavy duty spiral spring, i.e., one capable of 360 degrees of rotation and of about 13" diameter, about 0.275" in thickness, and about 3.14" in width, such as those sold by Kern-Liebers.

Benefits of the invention include that: (1) thrust from this invention will increase miles per gallon (MPG) or an electric vehicle's battery range, especially in stop and go traffic; (2) carbon emissions are reduced; (3) the performance/race community has another option for making their cars quicker; (4) reduced operating cost for delivery vehicle stop and go operations; (5) as the Outer Rim incorporates the inflated tire, it will be easier to service the tire; and the Torque Clutch at rest is a zero-interference component to wheel travel.

Note that in the specification and claims, "about" or "approximately" means within ten percent (10%) of the numerical amount cited.

While the invention is believed to be most useful in the motor vehicle braking application, the invention can be similarly employed to provide forklift load assist, elevator inertia assist, and like applications.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A regenerative braking apparatus for a motor vehicle, said apparatus comprising:
    an outer rim and an inner rim, forming a circular two-part rim when assembled;
    a power spring inside said circular two-part rim;
    a winding apparatus transferring energy into said power spring, said winding apparatus comprising a cone brake portion and a wheel drum brake portion;
    a speed reducer that allows for accumulation of tension in said power spring; and
    a controlled wheel drum holding brake system that allows for bypassed, autonomous, or on-demand application of said regenerative braking apparatus; and
    wherein said apparatus is mountable on the motor vehicle.

2. The apparatus of claim 1, wherein there is no interference by said regenerative braking apparatus during non-braking operation of the motor vehicle.

3. The apparatus of claim 1, additionally comprising a power transfer coupler assembly controlling said winding apparatus.

4. The apparatus of claim 1, wherein said power spring is a spiral spring.

5. The apparatus of claim 4, wherein said power spring is a heavy duty spiral spring.

6. The apparatus of claim 1, wherein said power spring builds tension at a rate that is determined by said speed reducer configuration of about 2:1 revolutions.

7. A regenerative braking method for a motor vehicle, the method comprising the steps of:
    providing an outer rim and an inner rim, forming a circular two-part rim when assembled;
    inserting a power spring inside the circular two-part rim;
    allowing a winding apparatus to transfer energy into the power spring, the winding apparatus comprising a cone brake portion and a wheel drum brake portion;
    employing a speed reducer that allows for accumulation of tension in the power spring; and
    providing a controlled wheel drum holding brake system that allows for bypassed, autonomous, or on-demand application of the regenerative braking method for the vehicle, whether the vehicle is in motion or at rest.

8. The method of claim 7, wherein there is no interference caused by the method during non-braking operation of the motor vehicle.

9. The method of claim 7, additionally comprising controlling the winding apparatus with a power transfer coupler assembly.

10. The method of claim 7, wherein the power spring is a spiral spring.

11. The method of claim 10, wherein the power spring is a heavy duty spiral spring.

12. The method of claim 7, wherein the power spring builds tension at a rate that is determined by the speed reducer configuration of about 2:1 revolutions.

13. A regenerative braking retrofit kit for a motor vehicle, said kit comprising:
- an outer rim and an inner rim, forming a circular two-part rim when assembled;
- a power spring inside said circular two-part rim;
- a winding apparatus transferring energy into said power spring, said winding apparatus comprising a cone brake portion and a wheel drum brake portion;
- a speed reducer that allows for accumulation of tension in said power spring; and
- a controlled wheel drum holding brake system that allows for bypassed, autonomous, or on-demand application of said regenerative braking retrofit kit.

14. The kit of claim 13, wherein there is no interference by said regenerative braking apparatus during non-braking operation of the motor vehicle.

15. The kit of claim 13, additionally comprising a power transfer coupler assembly controlling said winding apparatus.

16. The kit of claim 13, wherein said power spring is a spiral spring.

17. The kit of claim 16, wherein said power spring is a heavy duty spiral spring.

18. The kit of claim 13, wherein said power spring builds tension at a rate that is determined by said speed reducer configuration of about 2:1 revolutions.

\* \* \* \* \*